United States Patent
Roush et al.

(10) Patent No.: US 7,152,912 B1
(45) Date of Patent: Dec. 26, 2006

(54) COMPOSITE PANEL TRAILER SIDEWALL CONSTRUCTION

(75) Inventors: Mark Roush, Lafayette, IN (US); DeWayne Williams, West Lafayette, IN (US)

(73) Assignee: Vanguard National Trailer Corp., Elmhurst, IL (US)

( * ) Notice: Subject to any disclaimer, the term of this patent is extended or adjusted under 35 U.S.C. 154(b) by 0 days.

(21) Appl. No.: 11/210,076

(22) Filed: Aug. 23, 2005

(51) Int. Cl.
 *B62D 25/02* (2006.01)
(52) U.S. Cl. .................................. 296/186.1
(58) Field of Classification Search ............ 296/186.1, 296/182.1, 181.1, 191, 193.01, 193.05
See application file for complete search history.

(56) References Cited

U.S. PATENT DOCUMENTS

| | | | |
|---|---|---|---|
| 4,904,017 A | 2/1990 | Ehrlich | |
| 5,112,099 A | 5/1992 | Yurgevich | |
| 5,860,693 A | 1/1999 | Ehrlich | |
| 5,997,076 A * | 12/1999 | Ehrlich | 296/186.1 |
| 6,003,932 A | 12/1999 | Banerjea | |
| 6,220,651 B1 | 4/2001 | Ehrlich | |
| 6,412,854 B1 | 7/2002 | Ehrlich | |
| 6,450,564 B1 | 9/2002 | Sill | |
| 6,578,902 B1 | 6/2003 | Sill | |
| 6,824,341 B1 | 11/2004 | Ehrlich | |
| 6,986,546 B1 * | 1/2006 | Ehrlich | 296/191 |
| 2001/0024055 A1 * | 9/2001 | Ehrlich | 296/191 |
| 2002/0109377 A1 * | 8/2002 | Ehrlich | 296/191 |
| 2005/0241253 A1 * | 11/2005 | Song et al. | 52/578 |
| 2006/0028050 A1 * | 2/2006 | Ehrlich | 296/186.1 |

\* cited by examiner

*Primary Examiner*—H Gutman
(74) *Attorney, Agent, or Firm*—Dowell Baker, P.C.; Anthony Dowell

(57) ABSTRACT

The improved composite panel trailer sidewall construction of the present invention includes panels that are embossed to create recessed grooves adjacent to but spaced apart from the edges of the panels. Posts are used to join the panels, with the lateral wings of the posts seating in the recessed grooves on the interior of the trailer to minimize the thickness of the container sidewalls. The posts increase the rigidity of the joints between the panels as compared to flat splicer plates of comparable weight and material. With the lateral wings of the posts seated in the recessed grooves, a relatively smooth interior container sidewall free of snag points and protrusions is also achieved.

21 Claims, 4 Drawing Sheets

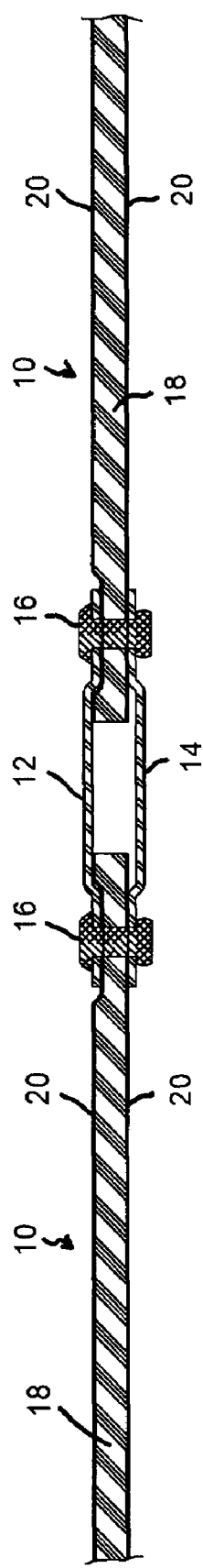
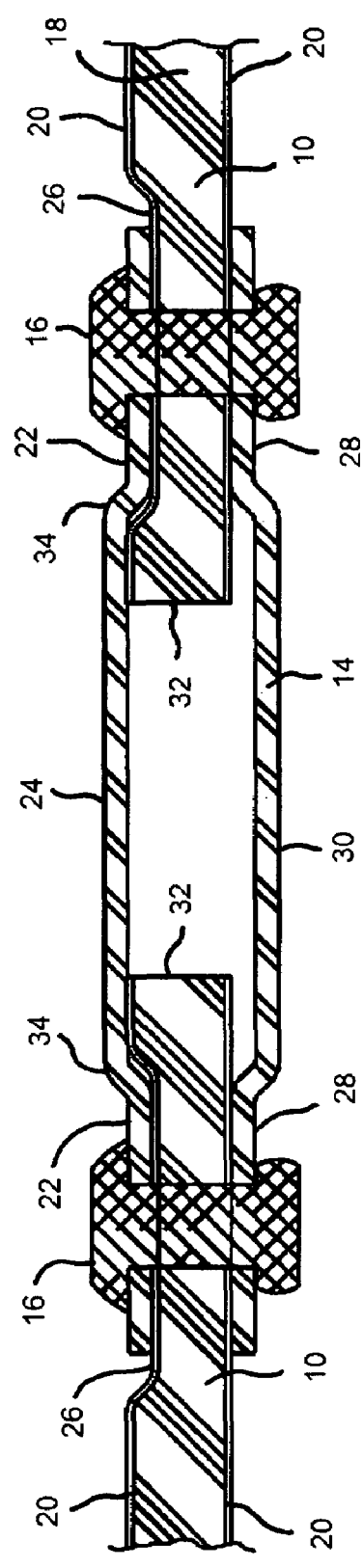
FIG. 1
FIG. 2

COMPOSITE PANEL TRAILER SIDEWALL CONSTRUCTION

FIELD OF THE INVENTION

The present invention relates generally to the sidewall construction for a cargo container, and more particularly to a composite plate trailer sidewall construction.

BACKGROUND OF THE INVENTION

Designers of cargo containers have long faced many related challenges in the design of container sidewalls. First, the structural integrity of the overall container depends on the rigidity and strength of the sidewalls. Second, the sidewalls are optimally light in weight to reduce the transportation costs for the overall container.

Third, government regulations and industry standards often limit the exterior dimensions of cargo containers. Thus, to maximize the capacity of the container, designers of cargo containers seek to minimize the width of the walls of the container without compromising the structural integrity of the container.

Fourth, because cargo containers are repeatedly loaded and unloaded, the interior walls of the container must be resistant to the repeated impact of vehicles and implements used to load and unload the container, and must also optimally be free of protrusions and snag points that could impede the loading or unloading of the container. Fifth, means for securing and dividing cargo within a container are often desirable, and may be provided by incorporating logistics slots in the sidewalls of the container. Other considerations, including the cost and availability of the sidewall components and the ease of manufacturing the sidewalls, are also important.

These challenges are particularly acute in the design and construction of sidewalls for over-the-road trailers. Structural integrity for trailers is of course essential to the safe transportation of goods and materials on public highways. This structural integrity may be provided by vertical posts or ribs incorporated in the sidewalls of the trailer. In this prior art design, known as "sheet and post" construction, the vertical posts are typically formed by bending or roll forming galvanized steel or extruding aluminum into a wide variety of cross sections. Relatively thin sidewall panels, typically made of plywood or plastic, are attached to the vertical posts in the interior of the trailer and a protective outer skin, typically made of very thin aluminum, is attached to the vertical posts on the exterior of the trailer. A protective metal, wood or plastic liner may be provided at the base of the interior sidewall to protect the panels and posts from being damaged or pierced by vehicles loading and unloading the trailer.

The vertical posts used in "sheet and post" trailer sidewall designs have been made with a wide variety of cross sections. Although widely varied in specific design, these posts share the common feature and advantage of increased rigidity based on the cross-section of the posts, which resists bending both perpendicular and parallel to the plane of the trailer sidewall. This rigidity provides the essential structural integrity for the trailer.

An alternative to "sheet and post" construction is structural panel trailer sidewall construction. In this design, the trailer sidewall panels or plates, rather than posts, provide the essential structural integrity for the trailer. These structural panels may be made of solid aluminum, but are more conventionally a composite panel constructed of a core plastic material and an outer skin of aluminum or steel. These composite panels are typically joined at their edges with vertical splicer plates on the inside and the outside of the trailer, as shown in U.S. Pat. No. 4,904,017 (FIG. 9) issued to Ehrlich.

The use of composite panels provides many advantages in the construction of trailers. In particular, because of the strength and rigidity of the composite panels, trailer sidewall thickness can generally be reduced as compared to conventional sheet and post designs. Current state and federal regulations limit the exterior width of a trailer to 102.38 inches. Using composite panels joined with plates, the thickness of the trailer sidewalls can be reduced to less than 0.625 inches each, providing an interior width of at least 101 inches. This additional interior width greatly increases the interior capacity of the trailer and the options for loading and storing cargo in the trailer.

Composite panel designs, however, must overcome the problem of creating snag points or protrusions on the interior of the trailer where the panels are joined. Snag points or protrusions on the inside of the trailer may cause cargo, pallets and loading vehicles to catch on the interior wall of the trailer as cargo is loaded and unloaded, thus creating the potential for damage to cargo and the trailer sidewall. Therefore, it is desirable for the sidewalls of the trailer to be free of snag points and protrusions.

To address this issue, some composite panels have been coined at their ends so as to compress the plastic core and create a recessed portion along the edge of the panel, as shown in U.S. Pat. No. 5,860,693 (FIG. 2) issued to Ehrlich. The coined panels with recessed edges are then joined with a splicer plate. Because the splicer plate seats in the recessed edges, the interior wall of the trailer is relatively free of snag points and protrusions.

As noted in U.S. Pat. No. 6,450,564 issued to Sill, however, coining the edges of a composite panel creates certain problems. Sill notes that the coining of the edges "either reduces the amount of core material at the edges, or severely compresses it," thereby compromising the structure of the composite sidewalls. Sill addresses this problem, as shown in the '564 patent (FIG. 3) and also U.S. Pat. No. 6,578,902 (FIGS. 4 and 5), by bending and offsetting the edges of the composite panel so as to form a plateau recessed from the main plateau of the composite panel. The composite panels with bent, offset edges are then joined with a splicer plate. Again, because the splicer plate seats in the recessed plateau along the edges of the composite panels, the interior wall of the trailer is relatively free of snag points and protrusions.

Alternatives and improvements to these prior art configurations for joining composite plates are desirable. In particular, the use of a post rather than a flat splicer plate provides certain advantages. Because the non-linear cross-section of a post increases the bending resistance both perpendicular and parallel to the plane of the trailer sidewall, this increased rigidity improves the structural integrity of the trailer. The use of a post with a non-linear cross-section, however, presents certain challenges that must be overcome to avoid substantially increasing the total thickness of the trailer sidewall and also to avoid creating snag points and protrusions on the interior of the trailer.

Accordingly, an object of the present invention is to provide a sidewall construction for a cargo container that utilizes posts rather than flat splicer plates to join composite plates to provide increased structural integrity for the container.

A further object of the present invention is to provide a cargo container with sidewalls of minimum overall thickness to maximize the capacity of the container.

Yet another object of the present invention is to provide a cargo container with interior walls free of protrusions and snag points that could impede the loading or unloading of the container.

An additional object of the present invention is to provide a cargo container using composite panels that are lightweight yet thin, rigid, strong, highly durable and easily replaced in the event of damage to a panel.

A still further object of the present invention is to provide a cargo container with interior logistics slots in the sidewalls of the container for securing cargo loaded into the container.

Finally, an object of the present invention is to provide a cargo container sidewall configuration that that is economical to manufacture and refined in appearance.

SUMMARY OF THE INVENTION

The composite panel container sidewall construction of the present invention achieves the benefits of conventional composite panel designs, including the recognized benefit of thin container sidewalls that provide an overall interior trailer width of at least 101 inches. The present invention also utilizes posts rather than flat splicer plates to increase the rigidity of the joints between the plates and improve the structural integrity of the container.

The composite panels of the present invention are embossed to create recessed grooves parallel and adjacent to the edges of the panels, but inset from the edges of the panels. Posts are used to join the panels, with the lateral wings of the posts seated in the recessed grooves on the interior of the trailer to minimize the thickness of the container sidewalls. With the lateral wings of the posts seated in the recessed grooves, a relatively smooth interior container sidewall free of snag points and protrusions is also achieved.

These and other advantages will become apparent as this specification is read in conjunction with the accompanying drawings and appended claims.

BRIEF DESCRIPTION OF THE DRAWINGS

FIG. 1 is a cross-sectional view of the composite panel sidewall construction of the present invention.

FIG. 2 is a magnified cross-sectional view of the composite panel sidewall construction of the present invention.

DETAILED DESCRIPTION

Figure 3:
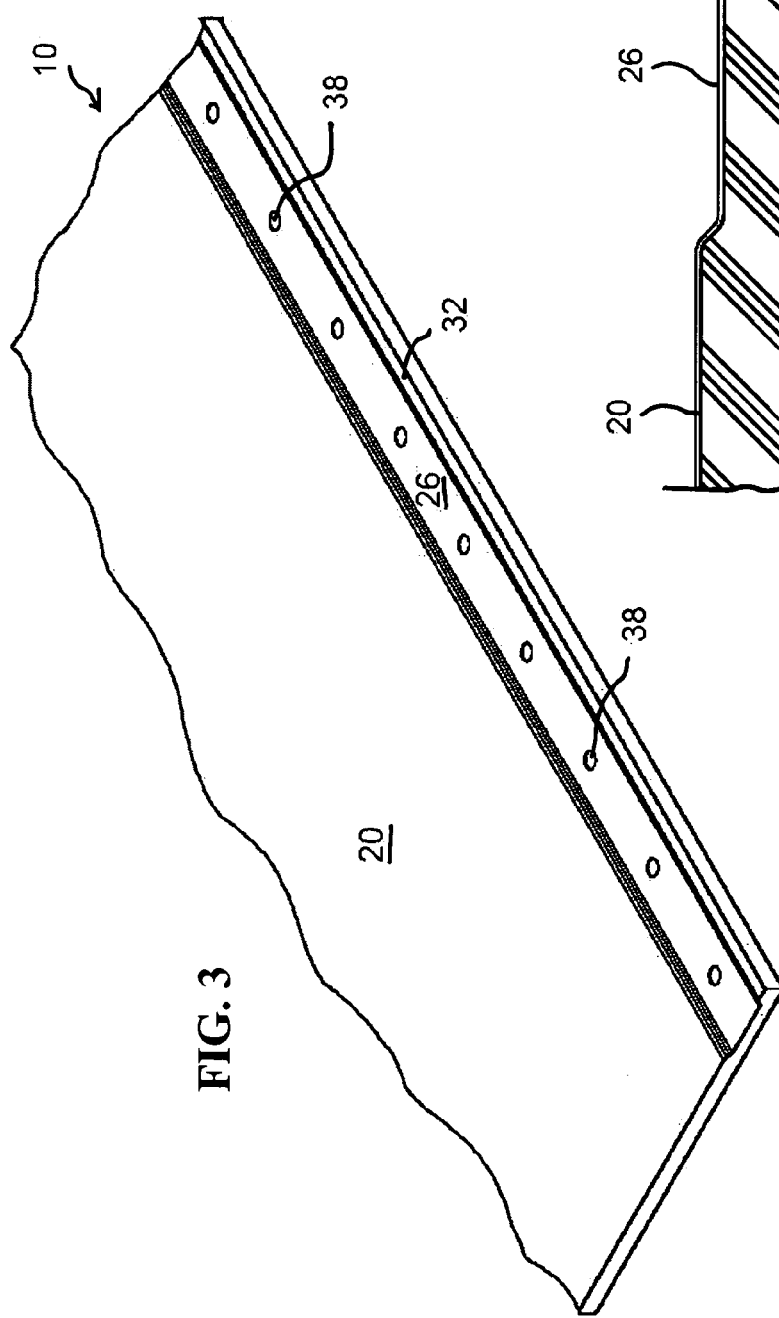
FIG. 3 is a perspective view of a portion of a composite panel with a recessed groove.

The present invention may be used with any type of transportable cargo container and is particularly suited for applications requiring a large, lightweight container that is regularly loaded and unloaded by utility vehicles. The improved sidewall construction of the present invention may be used with containers transported by road, rail, sea or air. However, for descriptive purposes, the present invention will be described in use with an over-the-road trailer.

FIG. 1 shows the improved composite panel sidewall construction of the present invention. The basic components of the composite panel sidewall construction are the composite panels 10, the interior post 12 and the exterior post 14. The posts 12 and 14 are secured to the composite panels 10 with rivets 16 to join the panels. The composite panels 10 are comprised of a plastic inner core 18 and outer skins 20. The outer skins 20 are preferably aluminum or steel, although other metals may also be used to create the composite panels. Although composite panels are preferable due to their high strength to weight ratio, solid panels may also be used and would be within the scope of the present invention.

A magnified view of the improved composite panel sidewall construction of the present invention is shown in FIG. 2. As shown in FIG. 2, the interior post 12 is comprised of two lateral wings 22 offset from a midsection 24. The lateral wings 22 of the interior post 12 seat in the recessed grooves 26 of the panels 10 and are riveted to the panels 10 and the exterior post 14 with the rivets 16. The recessed grooves are adjacent to the edges 32 of the panels 10, but inset and spaced apart from the edges.

In the preferred embodiment of the present invention, the exterior post 14 is also comprised of two lateral wings 28 offset from a midsection 30. The exterior post 14, however, may be replaced with a flat plate (not shown) and remain within the spirit and scope of the present invention. The exterior post 14 seats against and is riveted to the exterior side of the panels 10 as shown in FIG. 2.

As used herein, a post is defined as an extended member with a non-linear cross section. A plate, by comparison, is an extended member with a linear cross section. The non-linear cross section of a post provides increased rigidity as compared to a plate of equivalent weight made of the same material.

As shown in FIG. 3, the recessed groove 26 of the composite panel 10 runs parallel and adjacent to, but spaced apart from, the edge 32 of the panel 10. The recessed groove 26 is preferably created by embossing a flat composite panel, although alternative manufacturing methods are well known and would be within the scope of the present invention. For example, the recessed groove of the present invention could be created with preformed metal skins placed over and attached to a preformed or foamed core of plastic or other material. Alternatively, a solid panel material such as aluminum could be used with the groove milled out of the solid panel. The recessed groove 26 includes holes 38 for the insertion of rivets through and attachment of posts to the panel.

Figure 4:
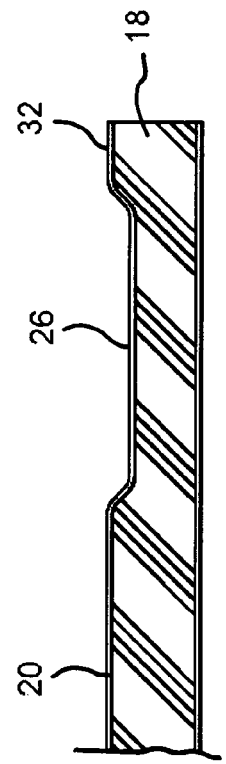
FIG. 4 is a cross-sectional view of a portion of a composite panel with a recessed groove and a flat edge portion.
Figure 5:
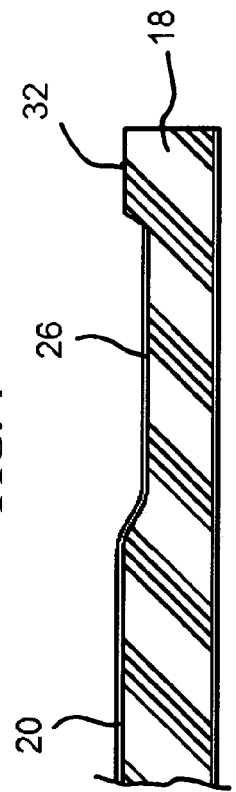
FIG. 5 is a cross-sectional view of a portion of a composite panel with a recessed groove and a rounded edge portion.
Figure 6:
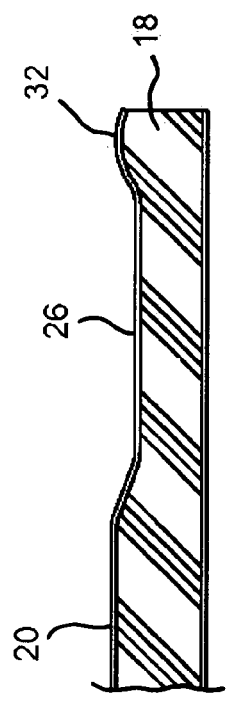
FIG. 6 is cross-sectional view of a portion of a composite panel with a recessed groove and a flat edge portion with an interior composite panel skin that stops short of the flat edge portion.

As shown in FIG. 4, the edge 32 of the panel 10 is preferably flat and of the same thickness as the remainder of the panel 10 other than the recessed groove 26. The edge 32 of the panel 10 may also be rounded, as shown in FIG. 5. The skin 20 of the panel 10 preferably covers the edge 32 of the panel 10, as shown in FIG. 4, but the composite panel may also be constructed with the skin covering the recessed groove 26 but stopping short of the edge, as shown in FIG. 6.

Figure 8:
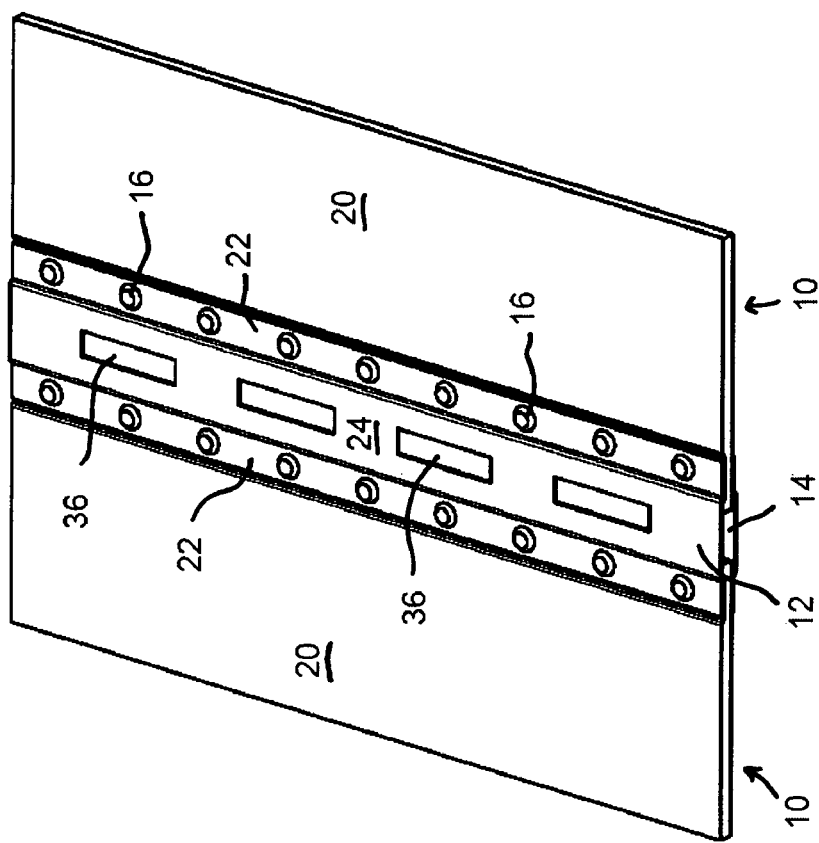
FIG. 8 is a perspective view of the composite panel sidewall construction of the present invention viewed from the interior of the container.
Figure 7:
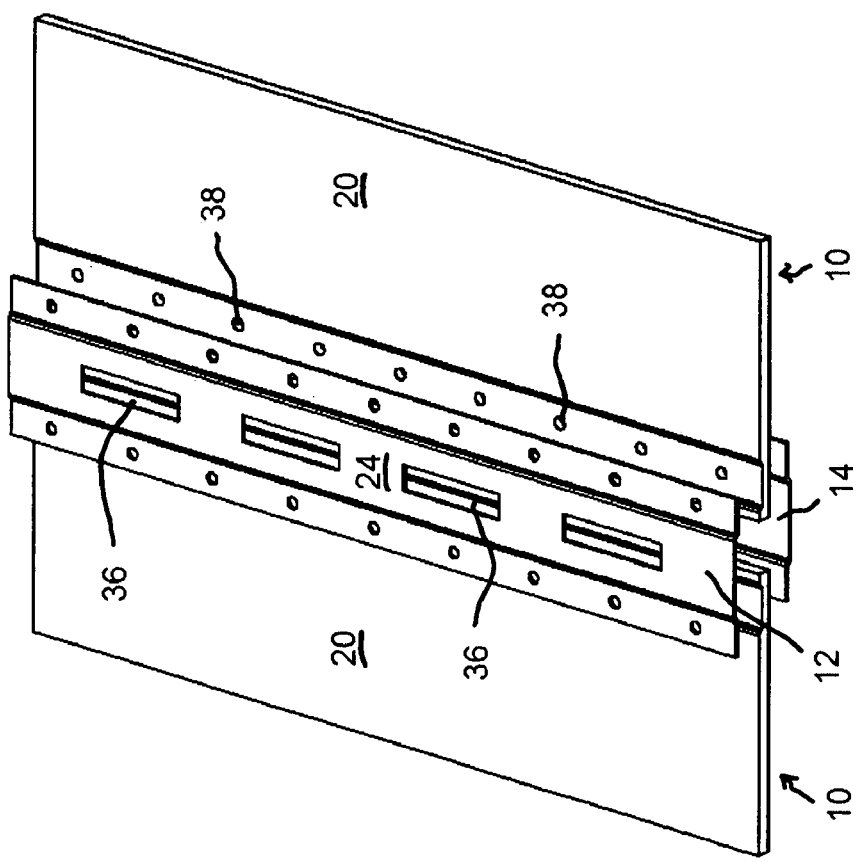
FIG. 7 is an exploded perspective view of the composite panel sidewall construction of the present invention viewed from the interior of the container.
Figure 10:
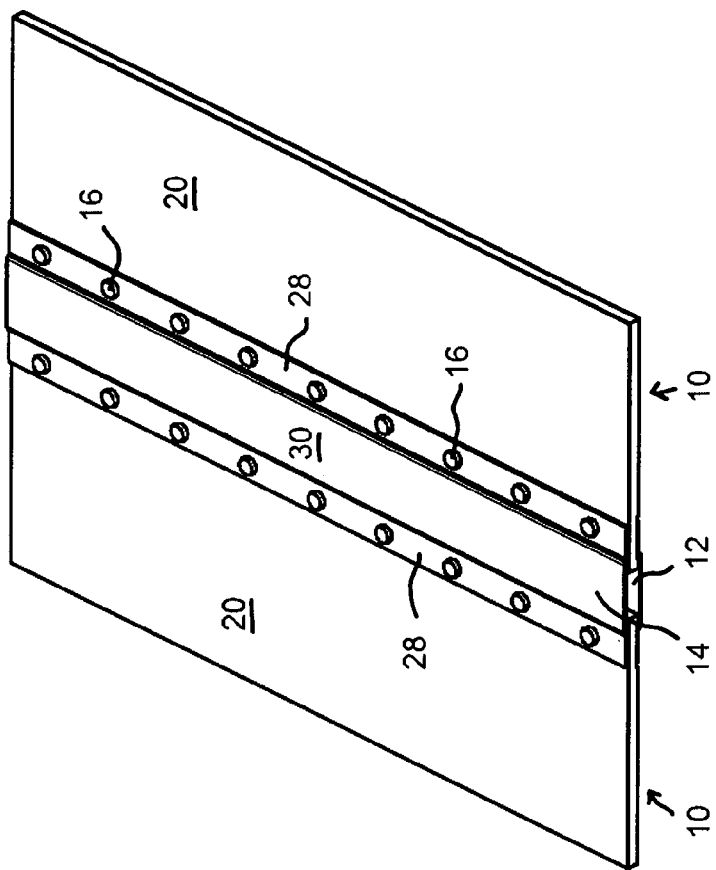
FIG. 10 is a perspective view of the composite panel sidewall construction of the present invention viewed from the exterior of the container.
Figure 9:
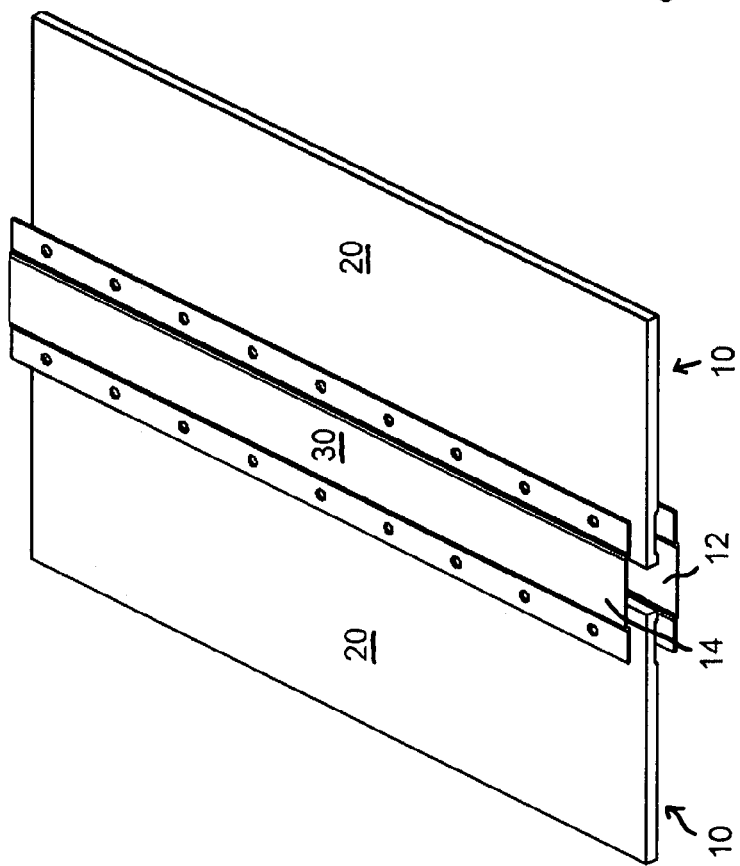
FIG. 9 is an exploded perspective view of the composite panel sidewall construction of the present invention viewed from the exterior of the container.

FIG. 7, viewed from the interior of the trailer, and FIG. 9, viewed from the exterior of the trailer, depict an exploded view of the interior post 12 and the exterior post 14 prior to attachment to the composite panels 10. FIG. 8 shows the interior post 12 from the interior of the trailer after attachment with the rivets 16. Logistics slots 36 are provided in the midsection 24 of the interior post 12 to accommodate logistics posts that may be placed in the interior of the trailer for the purpose of separating and securing cargo. FIG. 10 shows the exterior post 14 from the exterior of the trailer after attachment with the rivets 16.

As shown in FIGS. 1, 2 and 8, the composite panel sidewall construction of the present invention provides a smooth surface for the interior of the trailer. Because they are seated within the recessed grooves 26, the lateral wings 22 of the interior post 12 do not protrude beyond the inner skin 20 of the panels 10, and thus do not create a snag point for a vehicle or cargo to catch if it is being moved along the inner wall of the trailer. Also, although the interior surface of the midsection 24 of the interior post 12 extends slightly above the plane of the interior surface of the panels 10, a smooth transition 34 is provided from the lateral wings 22 to the midsection 24 of the post. In addition, the midsection 24 of the interior post 12 is supported by edges 32 of the panels 10, protecting the interior post 12 from being deformed or damaged if it is struck by a vehicle or cargo when the trailer is loaded and unloaded.

The recessed groove 26 allows the interior post 12 to seat in the composite panel 10, thus reducing the thickness of the trailer sidewall and increasing the interior width of the trailer. In addition, the use of an interior post with a non-linear cross-section provides increased rigidity for the post as compared to a comparable flat joining plate of the same weight and material.

The exterior post 14 is also preferably formed with the same cross section as the interior post 12. Because the midsection 30 is offset from the lateral wings 28 of the exterior post 14, additional space between the interior post 12 and the exterior post 14 is provided for the placement of logistics posts in the logistics slots 36 shown in FIG. 8. Also, an exterior post having a non-linear cross section provides additional strength and rigidity for the joint between the panels.

If space for logistics posts is not needed, however, a flat plate may be used to join the panels 10 on the exterior of the trailer, as noted above. Alternatively, to further reduce the thickness of the trailer sidewall, recessed grooves may also be provided on the exterior of the composite panels, allowing the exterior posts to be seated in these exterior grooves.

The inventors contemplate several alterations and improvements to the disclosed invention. For example, the interior and/or exterior posts may be modified to further increase their strength and rigidity, including forming the posts so that portions of one or both of the posts may be inserted in the logistics space between the edges of the composite panels Other alterations, variations, and combinations are possible that fall within the scope of the present invention. Although the preferred embodiment of the present invention has been described, those skilled in the art will recognize other modifications that may be made that would nonetheless fall within the scope of the present invention. Therefore, the present invention should not be limited to the apparatus and method described. Instead, the scope of the present invention should be consistent with the invention claimed below.

What is claimed is:

1. A container having an interior for the storage and transport of cargo and a sidewall construction, the sidewall construction of the container comprising:
    a plurality of panels, the panels having an interior side and an exterior side, the panels further having vertical recessed grooves on their interior side running parallel and adjacent to, but spaced apart from, opposite vertical edges of the panels;
    a plurality of vertically oriented and parallel interior posts inside the container, the posts having a pair of lateral wings lying on a common plane and a midsection connecting the lateral wings, the lateral wings seating in the recessed grooves of the panels and connecting adjacent panels;
    a plurality of vertically oriented and parallel exterior members outside the container, the exterior members connecting the interior posts and adjacent panels.

2. The container of claim 1 wherein the exterior members are posts.

3. The container of claim 1 wherein the exterior members are plates.

4. The container of claim 1 wherein the exterior members are posts; the panels further having vertical exterior recessed grooves on their exterior side running parallel and adjacent to, but spaced apart from, opposite vertical edges of the panels;
    the exterior posts having a pair of lateral wings lying on a common plane and a midsection connecting the lateral wings, the lateral wings seating in the exterior recessed grooves of the panels and connecting adjacent panels.

5. The container of claim 1 wherein the posts further include a plurality of logistics slots in the midsection of the posts.

6. The container of claim 5 wherein the exterior members are posts.

7. The container of claim 5 wherein the exterior members are plates.

8. The container of claim 1 wherein the panels are composite panels comprised of an inner core material and outer metal skins covering the inner core material.

9. The container of claim 8 wherein the exterior members are posts.

10. The container of claim 8 wherein the exterior members are plates.

11. An over-the-road trailer having a sidewall construction, the sidewall construction of the trailer comprising:
    a plurality of panels, each panel having at least one recessed groove adjacent to but spaced apart from an edge of the panel and further having an interior side and an exterior side;
    a plurality of posts attached to the panels on the interior side of the panels for joining the panels to form the sidewall of the trailer, the posts including a portion that seats in the recessed groove of the panels, the posts further serving to connect adjacent panels to form the trailer sidewall;
    a plurality of exterior members attached to the exterior side of the panels.

12. The trailer of claim 11 wherein the exterior members are posts.

13. The trailer of claim 12 wherein the interior posts further include a plurality of logistics slots.

14. The trailer of claim 11 wherein the posts further include a plurality of logistics slots.

15. The trailer of claim 11 wherein the exterior members are plates.

16. The trailer of claim 13 wherein the interior posts further include a plurality of logistics slots.

17. The trailer of claim 11 wherein the panels are composite panels comprised of an inner core material and outer metal skins covering the inner core material.

18. A panel for use in the construction of a container sidewall, the panel having:
   a top edge, a bottom edge, a first side edge, a second side edge, an interior surface and an exterior surface;
   the panel further including two recessed grooves on the interior surface adjacent to but spaced apart from the first side edge and the second side edge the two recessed grooves including a flat portion lying on a plane parallel to but recessed from the interior surface of the panel.

19. The panel of claim 18 wherein the panel is a composite panel comprised of an inner core material and outer metal skins covering the inner core material.

20. A container having an interior for the storage and transport of cargo and a sidewall construction, the sidewall construction of the container comprising:
   a plurality of panels, the panels having an interior side and an exterior side, the panels further having vertical recessed grooves on their interior side running parallel and adjacent to, but spaced apart from, opposite vertical edges of the panels;
   a plurality of vertically oriented and parallel interior posts inside the container, the posts having a pair of lateral wings and a midsection connecting the lateral wings, each lateral wing having a flat portion lying on a common plane, the lateral wings seating in the recessed grooves of the panels and connecting adjacent panels.

21. The container of claim 20, the container further including a plurality of vertically oriented and parallel exterior members outside the container, the exterior members connecting to the interior posts and adjacent panels.

* * * * *